(12) United States Patent
Jai et al.

(10) Patent No.: US 6,643,658 B1
(45) Date of Patent: Nov. 4, 2003

(54) HIERARCHICAL DATA NETWORK ADDRESS RESOLUTION

(75) Inventors: Ben Jai, River Edge, NJ (US); Clifford E Martin, Martinsville, NJ (US); Abraham Silberschatz, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/487,516

(22) Filed: Jan. 19, 2000

(51) Int. Cl.[7] .............................................. G06F 17/30
(52) U.S. Cl. ............................. 707/100; 707/1; 707/5; 707/10; 707/501; 709/203
(58) Field of Search .......................... 707/10, 9, 1, 501, 707/5; 709/203

(56) References Cited

U.S. PATENT DOCUMENTS

| | | | | |
|---|---|---|---|---|
| 4,833,594 A | * | 5/1989 | Familetti et al. | 713/1 |
| 5,764,906 A | | 6/1998 | Edelstein et al. | 395/200.49 |
| 5,813,007 A | * | 9/1998 | Nielsen | 707/10 |
| 5,847,708 A | * | 12/1998 | Wolff | 345/764 |
| 5,877,767 A | * | 3/1999 | Yohanan | 345/738 |
| 6,018,748 A | * | 1/2000 | Smith | 707/501.1 |
| 6,061,738 A | | 5/2000 | Osaku et al. | 709/245 |
| 6,072,491 A | * | 6/2000 | Yohanan | 345/835 |

(List continued on next page.)

FOREIGN PATENT DOCUMENTS

| | | | | |
|---|---|---|---|---|
| WO | WO 98/09243 | 3/1998 | ........... | G06F/19/00 |
| WO | WO 99/39275 | 8/1999 | ........... | G06F/13/14 |

OTHER PUBLICATIONS

Web Page: http://www.clickmarks.com/, which is the website of clickmarks: *Online–Book marks Manager,* printed Dec. 2, 1999, (1 page).

Web Page: http://dir.lycos.com/computers/Internet/WWW/Web_Applications/Bookmark$_{13}$ Managers/, which is the Lycos directory listing for the category: *Computers<Internet< www<web Applications< Bookmark Managers,* printed Dec. 2, 1999, (3 pages).

Web Page: http://www2.realnames.com/virtual.asp?page=Eng_Subscribe_FAQ, which is the web page of *Real Names Corporation—Frequently Asked Questions—Internet Keywords,* printed Dec. 1, 1999, (7 pages).

Web Page: http://www.itlist.com/Explain/, which is the website of itlist–*The Bookmark Portal,* printed Dec. 2, 1999, (8 pages).

Web Page: http://www.ezlogin.com/help/keybenefits.html/, which is the web page of *Key Benefits of ezlogin.com,* printed Dec. 2, 1999, (2 pages).

Web Page: http://www.ezlogin.com/help/faq.html/, which is the web page of ezlogin. *Frequently Asked Questions,* printed Dec. 2, 1999, (12 pages).

*Primary Examiner*—Jean M. Corrielus
(74) *Attorney, Agent, or Firm*—Jeffrey M. Weinick

(57) ABSTRACT

A network server stores database tables for use in resolving labels into network addresses as requested by a remote browser client. Each user has an associated address-table which stores user defined labels associated with network addresses. Users may access other user's address-tables if such other users grant authority to do so. Each user defines the address-tables to be searched, along with a search order, to be used when the user requests that a label be resolved into a network address. During address resolution, the server will resolve a received label into the network address associated with the label as defined by the first accessed address-table which contains the label. The search order as defined by the user may be overridden for a particular address resolution request by an appropriate user command. In various embodiment, the network addresses may be WWW addresses and electronic mail addresses.

26 Claims, 15 Drawing Sheets

U.S. PATENT DOCUMENTS

| | | | |
|---|---|---|---|
| 6,151,624 A | * 11/2000 | Teare et al. | 707/5 |
| 6,199,098 B1 | * 3/2001 | Jones et al. | 707/501.1 |
| 6,209,027 B1 | * 3/2001 | Gibson | 707/10 |
| 6,334,145 B1 | * 12/2001 | Adams et al. | 345/650 |
| 6,338,082 B1 | * 1/2002 | Schneider | 709/203 |
| 6,349,970 B1 | * 2/2002 | Fero | 281/42 |
| 6,397,219 B2 | * 5/2002 | Mills | 707/10 |
| 6,427,175 B1 | * 7/2002 | Khan et al. | 709/245 |
| 6,493,702 B1 | * 12/2002 | Adar et al. | 707/3 |
| 2003/0014399 A1 | * 1/2003 | Hansen et al. | 707/3 |

* cited by examiner

FIG. 3

USER-1.ADDRESS-TABLE

| LABEL | URL | COMMENT |
|---|---|---|
|  |  |  |
| NEWS | WWW.NEWSPAPER.COM | NEWSPAPER WEB SITE |
|  |  |  |

310

318

USER-1.ACCESS-TABLE

| USERID |
|---|
|  |

320

USER-1.VISIBLE-TABLE

| USERID |
|---|
|  |

330

USER-1.SEARCH-TABLE

| USERID |
|---|
|  |

340

HIERARCHICAL DATA NETWORK ADDRESS RESOLUTION

FIELD OF THE INVENTION

The present invention relates generally to data networks. More particularly, the present invention relates to data network address resolution using user defined labels.

BACKGROUND OF THE INVENTION

The Internet, and more particularly the World Wide Web (WWW), has been growing at a tremendous rate. As is well known, WWW network address locations are identified by a Uniform Resource Locator (URL). For example, the URL for the home page of ABC Co. may illustratively be www.abc. As users navigate the WWW, commonly called browsing, they come across sites of interest which they may want to return to at a later time. Such sites are sometimes referred to as favorites. A technique known as bookmarking allows a user to save the URLs of favorite sites in the user's browser. At a later time the user may access his/her bookmarks to return to a favorite site. Current browsers also allow a user to associate a label, which is easier to remember than the full URL, with bookmarked URLs. Thus, for example, a user may assign the label ABC to the bookmarked URL www.abc.com. Current browsers also allow users to organize bookmarks in a hierarchical manner using folders.

While it is known to share bookmarks via electronic mail or via a centrally stored database of bookmarks, the current bookmark management techniques fail to provide the advantages of the present invention.

SUMMARY OF THE INVENTION

The present invention provides an improved method for resolving labels into network addresses. In accordance with the invention, labels are resolved into network addresses by accessing so-called address-tables in accordance with a user defined hierarchical search preference. This hierarchical searching, combined with the ability to access the address-tables of other users, provides many advantages over the existing network bookmarking techniques.

In accordance with an embodiment of the invention, each user maintains an address-table which stores user defined labels and associated network addresses. Each user also maintains a search-table which defines the address-tables to be searched along with a search order, for use when the user requests a label resolution. The address-tables to be searched may include address-tables of entities other than the user who is requesting the label resolution, provided that the other entities grant the user access to their address-tables. Upon initiation of a label resolution, the address-tables identified in the user's search-table are accessed in the specified order. The associated network address from the first accessed address-table which contains the label will be used for address resolution. The user requesting address resolution may optionally modify the search order for particular label resolutions by providing special search commands along with the label to be resolved.

In one embodiment, the network addresses are WWW network addresses, and label resolution takes place in a network server which is accessible by a plurality of users executing WWW browsers on remote computers. Upon label resolution, the server returns a redirect command to a user's browser which results in the browser being redirected to the WWW network address associated with the label. In another embodiment, the network addresses are electronic mail addresses, and upon label resolution, the server returns a redirect command which causes the user's browser to open a mail application with a message addressed to the electronic mail address associated with the label.

The present invention provides many advantages over the existing network bookmarking techniques. For example, the user definable hierarchical search aspect of the invention allows multiple users to have the same labels associated with different network addresses. If a user requests a label resolution for a label which occurs in multiple address-tables in the user's search-table, the label will be resolved into the network address associated with the label in the address-table which the user has given the highest priority (i.e., the address-table which is searched earliest in the user's specified search order). An additional advantage results from the sharing aspects of the. invention. A network address associated with a label may be updated in one particular user's address-table, and all user's who share access to that particular user's address-table get the benefit of the update without having to make any changes to their tables.

These and other advantages of the invention will be apparent to those of ordinary skill in the art by reference to the following detailed description and the accompanying drawings.

BRIEF DESCRIPTION OF THE DRAWINGS

FIG. 3 illustrates the data structures used in accordance with one embodiment of the invention.

DETAILED DESCRIPTION

Figure 1:
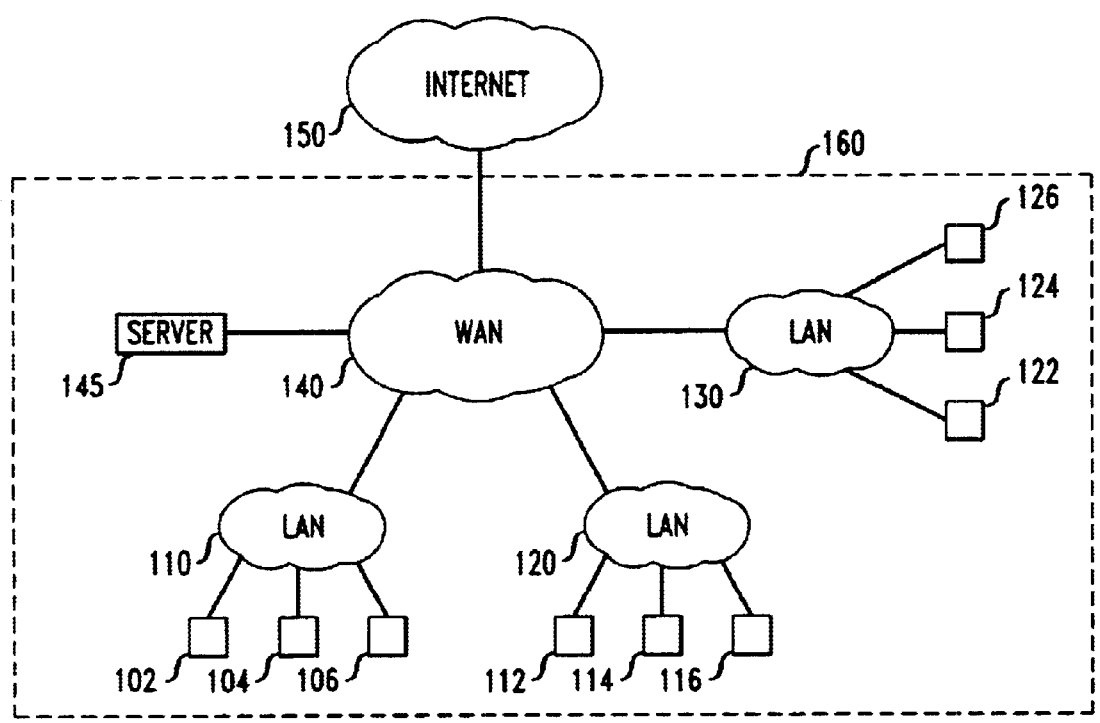
FIG. 1 shows a communication network of the type in which the present invention may be implemented.

FIG. 1 shows a communication network 100 of the type in which the present invention may be implemented. Data network 100 contains three local area networks (LAN) 110, 120, 130. Each LAN has a number of communication devices connected to it. In one embodiment, the communication devices are programmable computers executing computer programs which are known as browsers. A browser is a computer program which handles communication with remote servers by sending requests for information and formatting incoming responses for display on the computer screen. Browsers for use while navigating the Internet are well known. For example, Microsoft Internet Explorer and Netscape Navigator are two well known browser programs for use in navigating the World Wide Web (WWW). Because such browsers are well known, the detailed configuration of a computer executing a browser program will not be described herein.

As shown in FIG. 1, computers 102, 104, 106 are connected to LAN 110, computers 112, 114, 116 are connected to LAN 120, and computers 122, 124, 126 are connected to LAN 130. The LANs 110, 120, 130 are connected via a wide area network (WAN) 140. WAN 140 may also be connected to other communication networks, such as the Internet 150. As such, the computers 102, 104, 106, 112, 114, 116, 122, 124, 126 can communicated with each other, or with other computers via the Internet 150. Also connected to WAN 140 is server 145, which will be described in further detail below;

Assume that all components within dotted line 160 are associated with, and administered by, a single enterprise, such as a company. As such, the network components within dotted line 160 are sometimes referred to as an enterprise network. Further, assume that the computers connected to each LAN are part of a different division within the enterprise. For example, LAN 110 may be associated with, and administered by, the marketing department, LAN 120 may be associated with, and administered by, the advertising department, and LAN 130 may be associated with, and administered by, the sales department.

Thus, at one level, users of computers 102, 104, 106, 112, 114, 116, 122, 124, 126 are individuals, and they user their computers in an individual manner and more particularly, they retrieve information in an individual manner. At another level, the computer users within each LAN are a community of interest in that they are all associated with the same division within a company. At yet another level, all users of computers 102, 104, 106, 112, 114, 116, 122, 124, 126 are also a single community of interest in that they are all associated with the same company.

We have recognized that, in view of the various levels of computer user association, an improved technique for resolving labels into network addresses would be advantageous. As an example, consider a company-wide list which is compiled and maintained by a company administrator which contains labels and associated network addresses which would be of interest to the entire company population. Such a list may contain a label "news" which would be associated with an internal company server which provides daily news about the company. Similarly, there may be division-wide label lists which are compiled and maintained by administrators within each division which contain labels and associated network addresses which would be of interest to the user population within particular divisions. For example, the marketing division may have a label "news" which may be associated with a marketing division internal server which provides daily news about the marketing division. Finally, each individual user may wish to administer and maintain his/her own label list with labels of interest to the particular individual. For example, one individual may wish to have a label "news" associated with a local newspaper web site.

Figure 2:
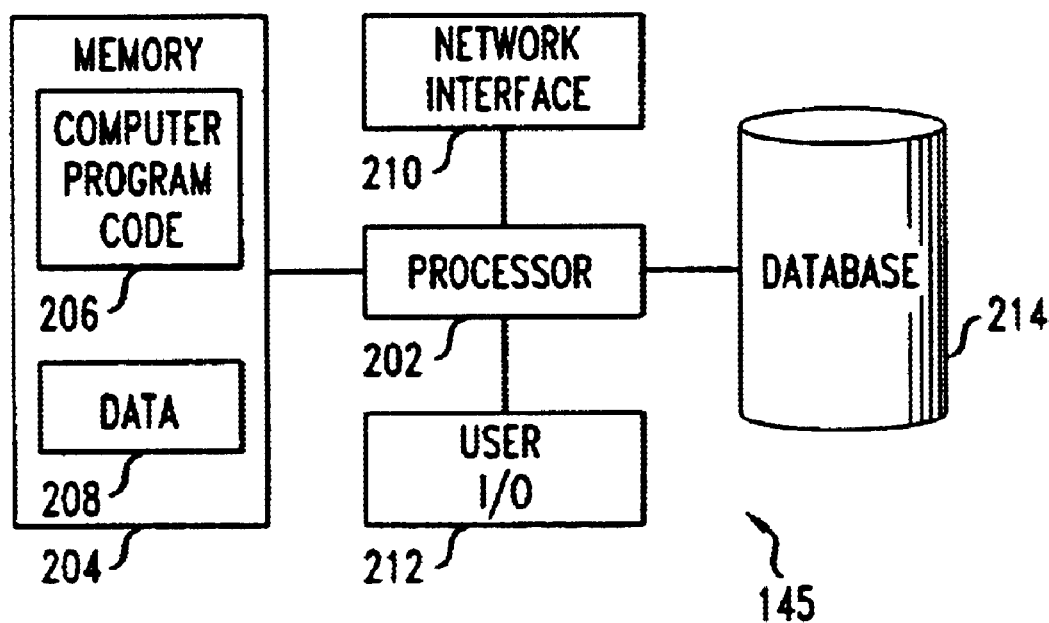
FIG. 2 shows a block diagram of a server which may be configured to operate in accordance with the present invention.

In one embodiment, the invention is implemented using a server 145 connected to a network, such as WAN 140. Server 145 is shown in further detail in FIG. 2. Server 145 contains a processor 202 for controlling the overall operation of server 145. Processor 202 is connected to a memory 204 which stores computer program code 206 and other data 208. The computer program code 206 contains computer program instructions which, when executed by processor 202, control operation of the server 145. Processor 202 is also connected to a network interface 210 which allows the server 145 to communicate with other devices via a communication network, such as WAN 140 (FIG. 1). Processor 202 is also connected to user input/output 212 which represents input and output devices which provide for user interaction with server 145. Such input and output devices may include, for example, keyboard, mouse, display screen, printer, or any other device which allows a user to interact with server 145. Processor 202 is further connected to a database 214 which stores the data structures used in one embodiment to implement the present invention. Network servers of the type described in conjunction with FIG. 2 are well known in the art and the details of such a network server will not be described herein. Given the present description of the invention, one skilled in the art could write appropriate program code in order to configure the server 145 to carry out the inventive technique.

We now describe the data structures which are stored in database 214 and which are used in one embodiment to implement the inventive technique. Each user is associated with various data structures stored in database 214. The data structures for an illustrative user, user-1, are illustrated in FIG. 3. It is noted here that the term user, as used herein, may refer to a single user of a computer, such as computers 102, 104, 106, 112, 114, 116, 122, 124, 126 (FIG. 1), or it may also refer to some other entity that may not be associated with a single computer. For example, an administrator for a community of interest, such as the marketing division or the company as a whole, may set up data structures in database 214, and such administrators are considered users. Each user of the system will have four tables stored in database 214 of server 145: address-table, access-table, visible-table and search-table. FIG. 3 shows these tables for a user having a user identification (userid) of user-1. A table associated with a particular user will be identified in this description as [userid].[table]. Thus, for example, the address-table of user-1 is identified herein as user-1.address-table. It is noted that FIG. 3 shows the data structures in a graphical form which is convenient for describing the relationships between tables and data items. Of course, there are various well known techniques for storing such data structures in a database while maintaining the desired relationships. For example, and without limitation, data structures may be stored as arrays, linked lists, and hash tables, and the particular storage implementation may vary.

An address-table is used to associate user defined labels with network addresses. Referring to FIG. 3, user-1.address-table 310 has three columns: label, URL, and comments. Each label has an associated URL which is a particular network address. Also associated with each label is an optional comment which may be some description the user would like to associated with the label and URL. An exemplary entry 318 in user-1.address-table 310 is shown which associates the label "news" with URL:"www.newspaper.com" and comment: "newspaper Web Site".

Each user also-maintains an access-table which the user uses to grant access to his/her address table. Thus, user-1.access-table 320 contains userids of users who have access to user-1.address-table 310. User-1 maintains user-1.access-table and may grant or revoke particular users access to user-1.adddress-table by adding or removing userids from user-1.access-table respectively.

For each user, the database 214 also stores a visible-table which contains userids of others who have granted the user access to their address-table. Thus, user-1.visible-table 330 contains the userids of users whose access-table contains user-1. The contents of a user's visible-table are not directly maintained by the user, but instead the contents of a user's visible-table is a function of the contents of other users' access-tables.

Figure 4:
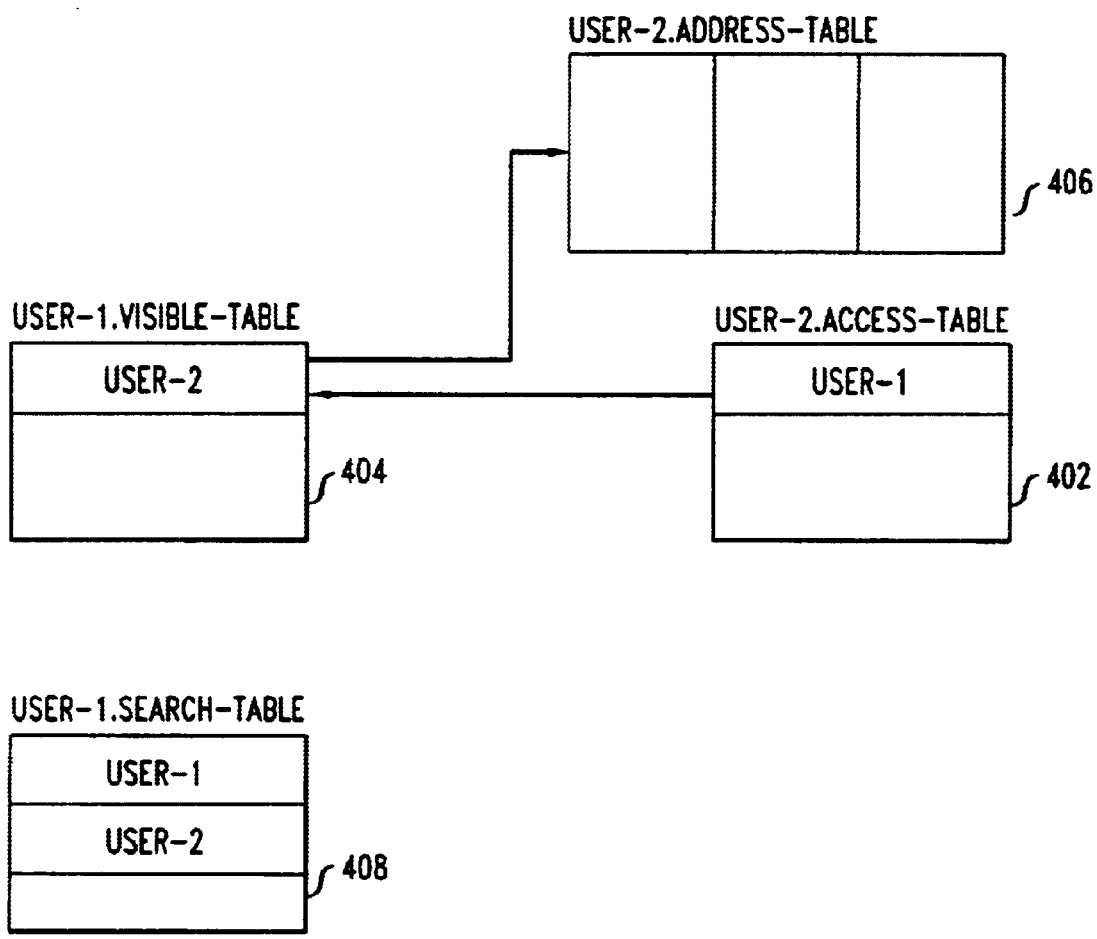
FIG. 4 show the relationship between certain data structures.

The relationship between the access-table and visible-table is illustrated in FIG. 4. The identification of user-1 in user-2.access-table 402 results in the identification of user-2 in user-1.visible-table 404. This, in effect, gives user-1 access to user-2.address-table 406 because user-2 has granted user-1 such access by placing an identification of user-1 in user-2.access-table 402.

Referring again to FIG. 3, each user also maintains a search-table which defines the address-tables searched, and the search order, when resolving addresses for the user associated with the search-table. User-1.search-table 340 contains user identifications in a particular order. When attempting to resolve a label into a network address for user-1, the system will search the address-tables of the users identified in user-1.search table in the order specified in the user-1.search-table. The address resolution procedure will be discussed in further detail below. In order for another's userid to be present in a particular user's search-table, the other's userid must also be present in the particular user's visible-table, indicating authority to access the other's address-table. The exception to this rule is that a user's userid may be present in the user's search-table, because a user always has access to his/her address-table. For example, referring to FIG. 4, user-1.search-table 408 may contain the userids of user-1 and user-2. This indicates that in resolving network addresses for user-1, the system will first search the user-1.address table and then the user-2.address table.

The functionality of the browsers executing on the user computers 102, 104, 106, 112, 114, 116, 122, 124, 126, the functionality of the server 145, and the interaction between the browsers and the server will now be described. As described above, a browser is a computer program executing on a computer, and as such, the functionality described herein may be added to such a browser by adding program code appropriate for performing the described functions. Similarly, the server 145 operates in accordance with compute program instructions stored as computer program code 206. As such, the functionality described herein may be added to a server by adding program code appropriate for performing the described functions.

Figure 5:
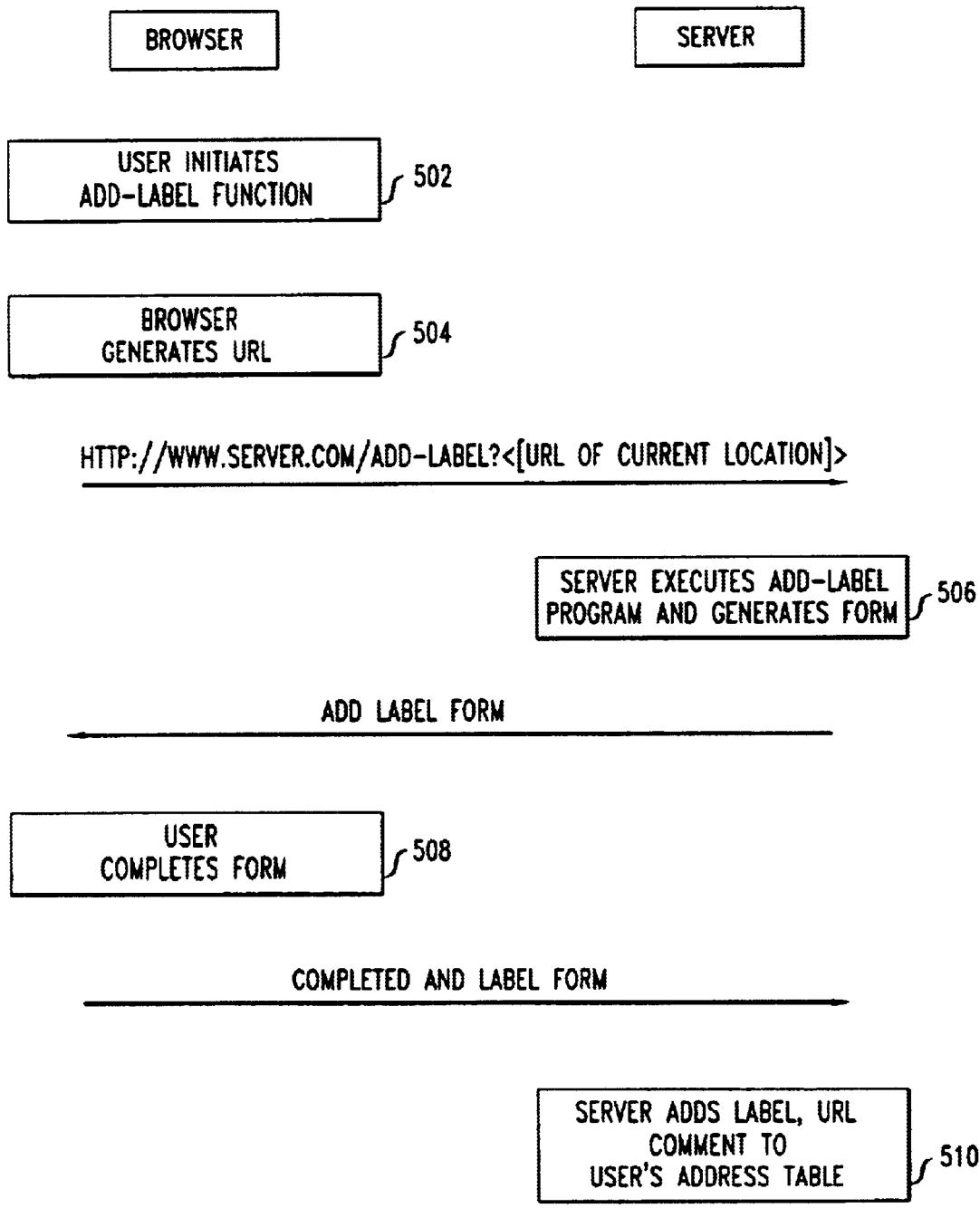
FIG. 5 illustrates the steps performed by, and the interaction between, the browser and server during the add-label function.

The first function is the "add-label" function which a user uses to add the current web site location as a bookmark. More particularly, the add-label function will add a label, associated URL, and optional comment, to the user's address-table in database 214 of the server 145. The add-label function will be described in conjunction with FIG. 5, which illustrates the steps performed by, and the interaction between, the browser and server during the add-label function. In step 502 the user of the browser initiates the add-label function by, for example, clicking on an appropriate icon on the computer screen, or by some other method. In response to initiation of the add-label function, in step 504 the browser generates the following URL, server.com/add-label?<[URL of current location]>. The first portion of the URL, www.server.com identifies the network address of the server 145. The next portion of the URL, add-label, identifies a program on the server 145. The last portion of the URL, [URL of current location], is a parameter which is passed to the add-label program. The parameter will contain the URL of the current web site location, (i.e., the URL of the web page currently being displayed on the browser). An http request containing the URL generated by the browser in step 504 is transmitted to the server in a well known manner. Upon receipt of the request, in step 506 the server executes the program identified by the request, the add-label program, which is stored as computer program code 206 in memory 204 of server 145 (FIG. 2). The execution of the add-label program results in the generation of an http form which is sent to the browser. The form will contain the URL of the current location, and will request that the user enter a label, and optional comment, to be associated with the URL in the user's address-table. In step 508 the user completes the form and returns the requested form information to the server. In step 510, the server adds a record to the user's address-table containing the URL, label, and optional comment. The server knows with which user it is communicating, and therefore which address-table to make the addition to, because the user's identification is passed to the server in a conventional manner in accordance with the http protocol.

Figure 6:
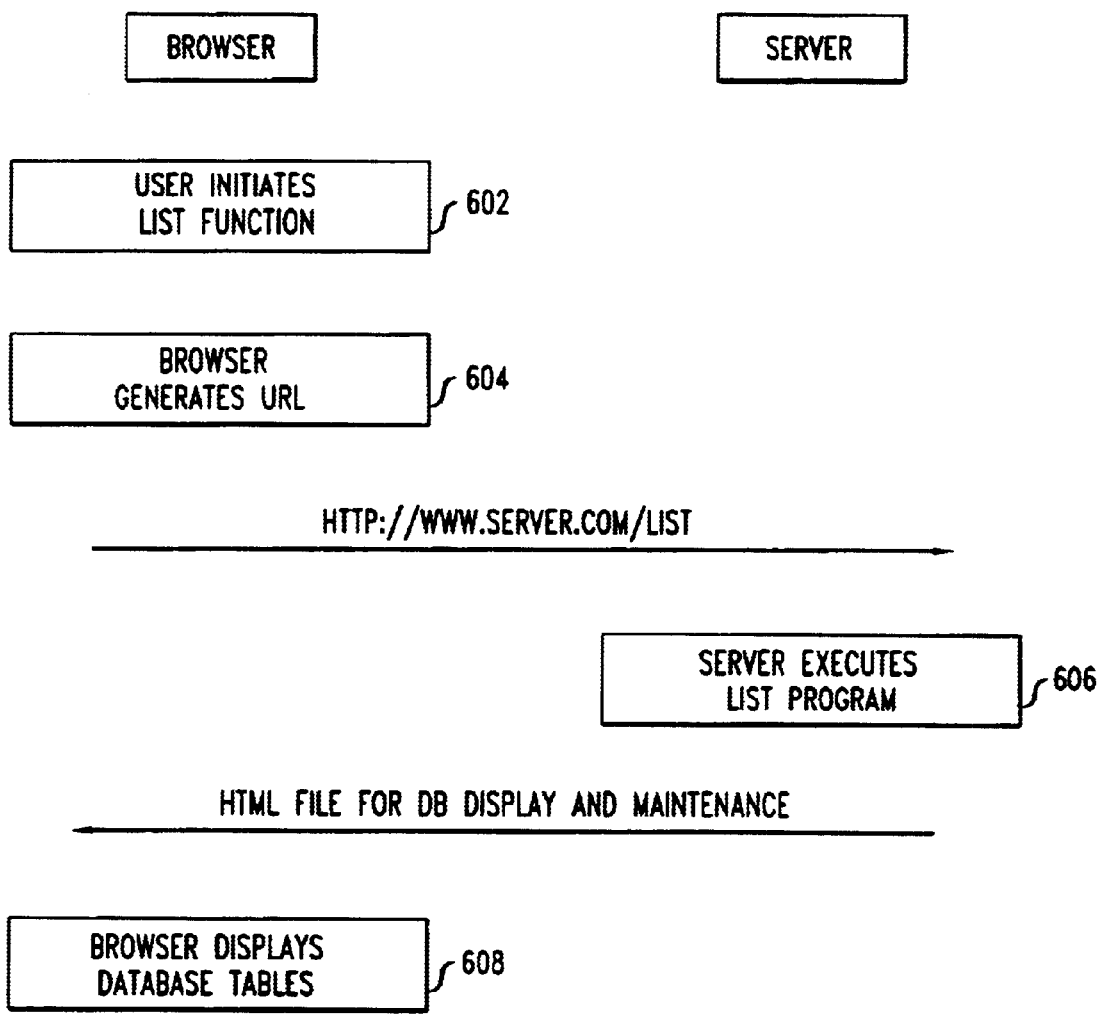
FIG. 6 illustrates the steps performed by, and the interaction between, the browser and server during the list function.

The next function is the "list" function which a user uses to view his/her database tables. The list function will be described in conjunction with FIG. 6, which illustrates the steps performed by, and the interaction between, a browser and server during the list function. In step 602 the user of the browser initiates the list function by, for example, clicking on an appropriate icon on the computer screen, or by some other method. In response to initiation of the list function, in step 604 the browser generates the following URL, .server.com/list. An http request containing the URL generated by the browser in step 604 is transmitted to the server in a well known manner. Upon receipt of the request, in step 606 the server executes the list program which is stored as computer program code 206 in memory 204 of server 145 (FIG. 2). The execution of the list program results in the generation of an html page which is sent to the browser. The html page is formatted to display on the browser the database tables associated with the user. Thus, upon receipt of the html page, in step 608 the browser will display the database tables stored in database 214 which are associated with the user. As described above in conjunction with FIG. 3, these tables include an address-table, access-table, visible-table, and search-table. At this point, the user may initiate various functions by clicking on various display icons. Of course, the design layout of the display and associated icons is a design choice depending on the particular implementation. For example, in one embodiment, the data associated with each of the tables may be displayed by the user's browsers. Alternatively, the browser may initially display less than all of the tables, with hyperlinks which would allow the user to request display of the non-displayed tables. The particular design layout will not be described in detail herein, but instead, we will describe the functionality associated with the browser display.

Figure 7:
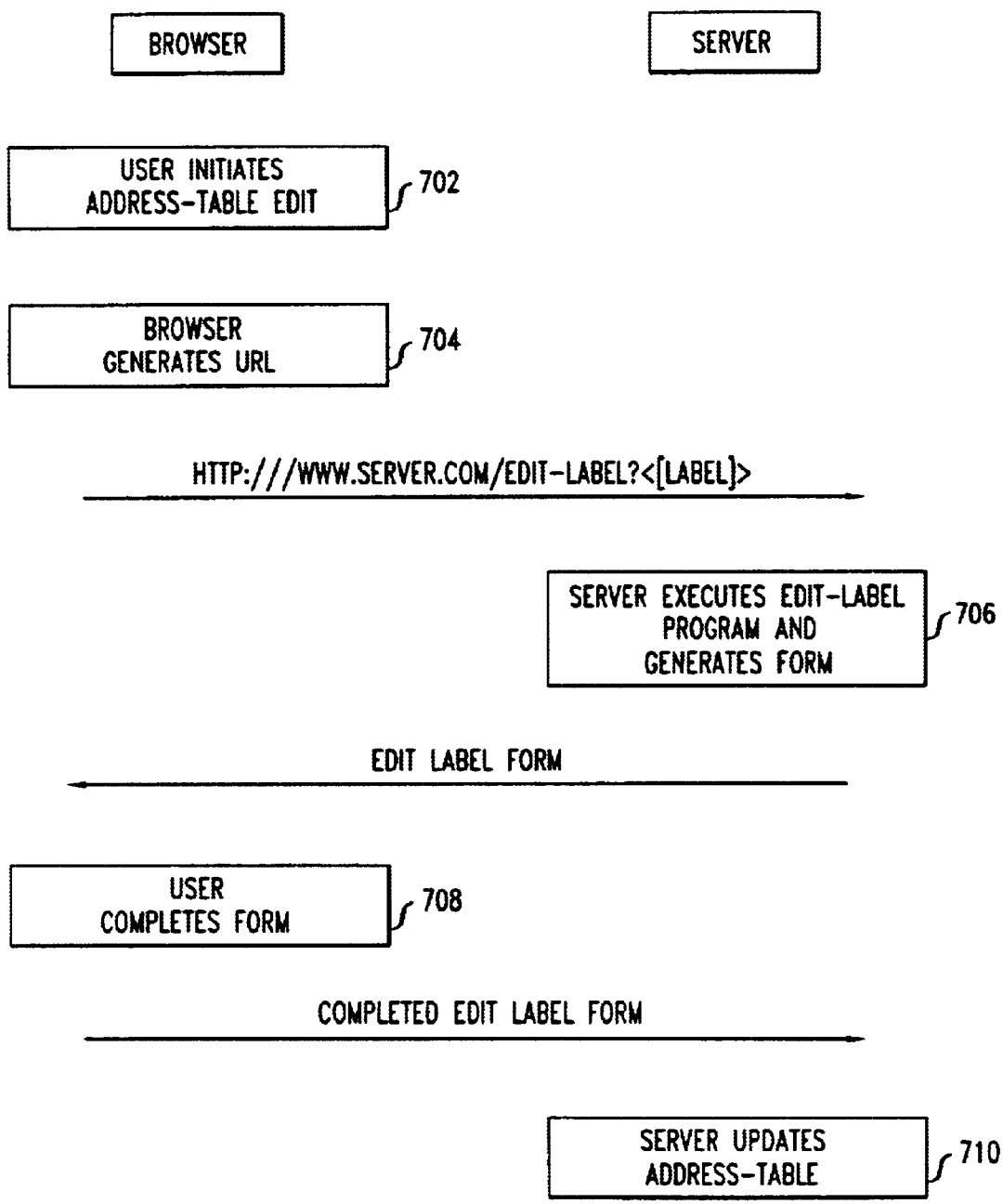
FIG. 7 illustrates the steps performed by, and the interaction between, the browser and server during the edit-label function.

First, the user may edit a particular record in the address-table by clicking on an edit icon which may be associated with each of the displayed address-table records. This edit-label function is described in conjunction with FIG. 7. In step 702 the user of the browser initiates the edit-label function by, for example, clicking on an edit icon on the computer screen associated with one of the records displayed in the address-table, or by some other method. In response to initiation of the edit-label function, in step 704 the browser generates the following URL, server.com/edit-label?<[label]>, where [label] is a parameter which is passed to the edit-label program which contains the label the-user has chosen to edit. An http request containing the URL generated by the browser in step 704 is transmitted to the server in a well known manner. Upon receipt of the request, in step 706 the server executes the edit-label program, which is stored as computer program code 206 in memory 204 of server 145 (FIG. 2). The execution of the edit-label program results in the generation of an http form which is sent to the browser. The form will contain the data currently stored in the chosen address-table record, and will request that the user edit the information. In step 708 the user completes the form and returns the requested form information to the server. In step 710, the server updates the address-table record in accordance with the information received from the user.

Figure 8:
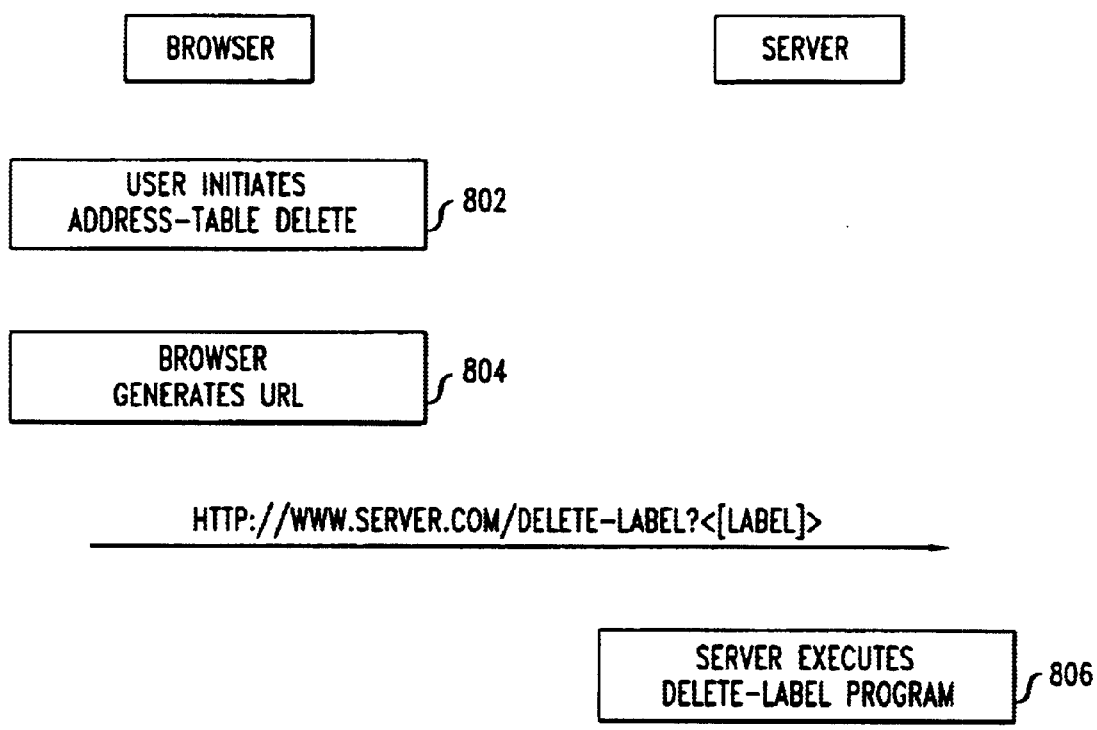
FIG. 8 illustrates the steps performed by, and the interaction between, the browser and server during the delete-label function.

A user may delete a particular record in the address-table by clicking on a delete icon which may be associated with each of the displayed address-table records. This delete-label function is described in conjunction with FIG. 8. In step 802 a user of the browser initiates the delete-label function by, for example, clicking on a delete icon on the computer screen associated with one of the records displayed in the address-table, or by some other method. In response to initiation of the delete-label function, in step 804 the browser generates the following URL, com/delete-label?<[label]>, where [label] is a parameter which is passed to the delete-label program which contains the label the user has chosen to delete. An http request containing the URL generated by the browser in step 804 is transmitted to the server in a well known manner. Upon receipt of the request, in step 806 the server executes the delete-label program, which is stored as computer program code 206 in memory 204 of server 145 (FIG. 2). The execution of the delete-label program results in the server deleting the appropriate address-table record.

Figure 9:
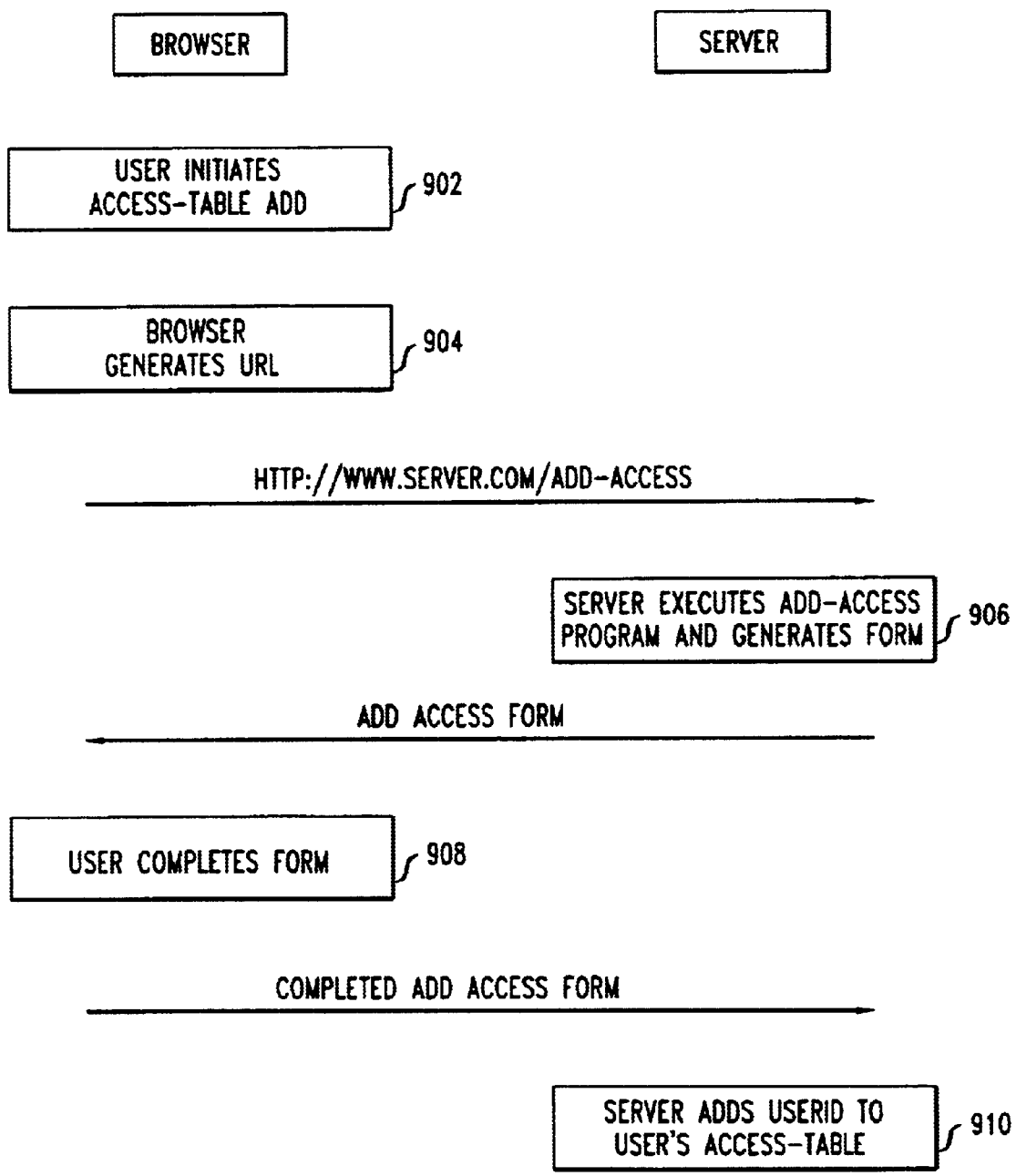
FIG. 9 illustrates the steps performed by, and the interaction between, the browser and server during the add-access function.

A user may also add and delete records in his/her access-table in order to grant and revoke access to the user's address-table. The add-access function will be described in conjunction with FIG. 9, which illustrates the steps performed by, and the interaction between, a browser and server during the add-access function. In step 902 the user of the browser initiates the add-access function by, for example, clicking on an add-access icon on the computer screen, or by some other method. In response to initiation of the add-access function, in step 904 the browser generates the following URL, http://www.server.com/add-access. An http request containing this URL is transmitted to the server in a well known manner. Upon receipt of the request, in step 906 the server executes the add-access program, which is stored as computer program code 206 in memory 204 of server 145 (FIG. 2). The execution of the add-access program results in the generation of an http form which is sent to the browser. The form will request that the user enter the userid of the user to be granted access. In step 908 the user completes the form and returns the requested form information to the server. In step 910, the server adds an appropriate record to the user's access-table.

The function of revoking access would result in a record being deleted from the access-table. Thus, a user would revoke access by, for example, clicking on a delete icon which is associated with a displayed userid which the user desires to remove from the access-table. The deletion of such a record would be performed in a manner similar to the deletion of a record form the address-table as described above in conjunction with FIG. 8. Instead of the browser generating the URL shown in FIG. 8, the browser would generate a URL of the form: server.com/delete-access<[userid]>, which would result in the server initiating the delete-access program and deleting from the access-table the record which contains the [userid] passed as a parameter in the URL.

Figure 10:
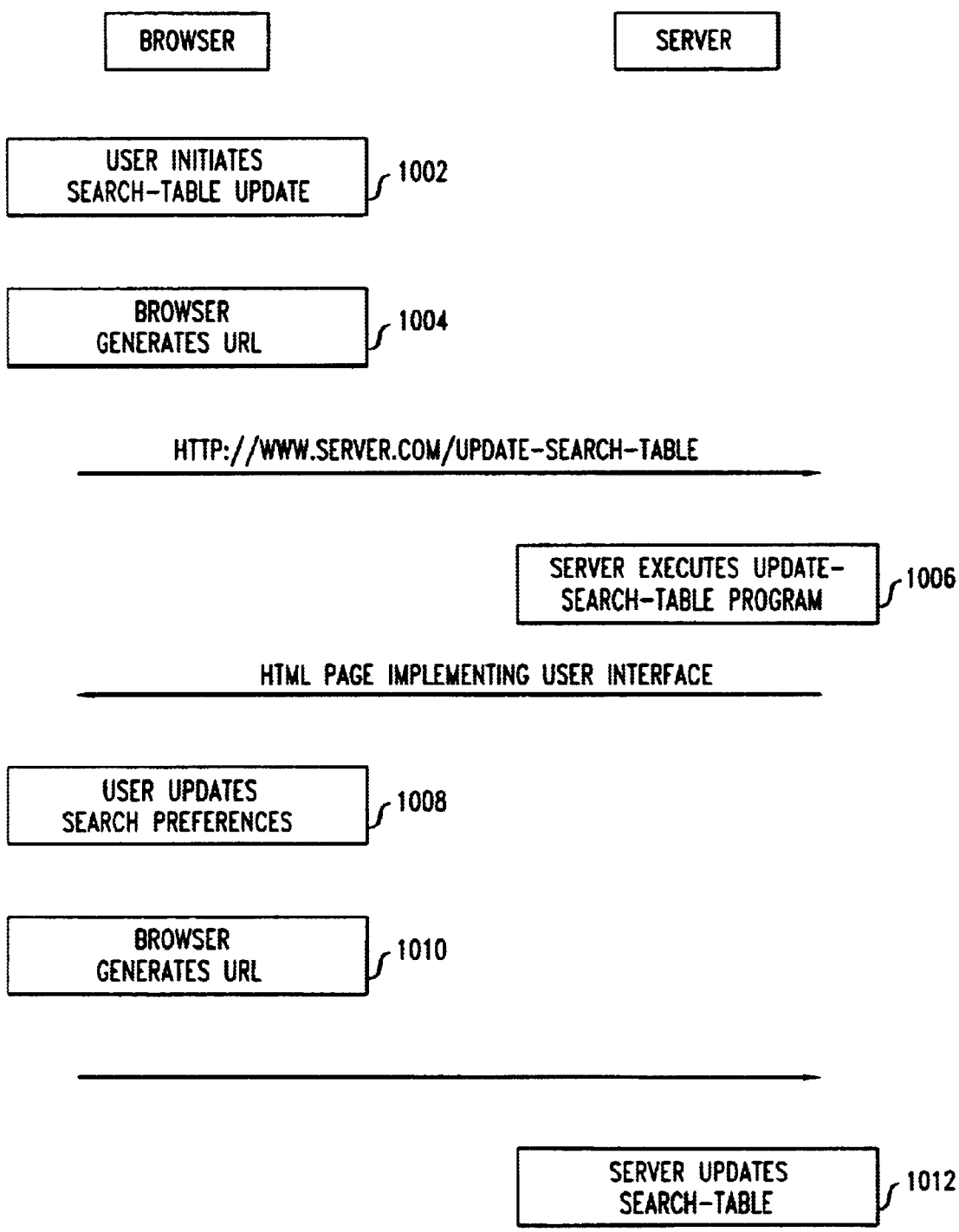
FIG. 10 illustrates the steps performed by, and the interaction between, the browser and server during the update-search-table function.
Figure 11:
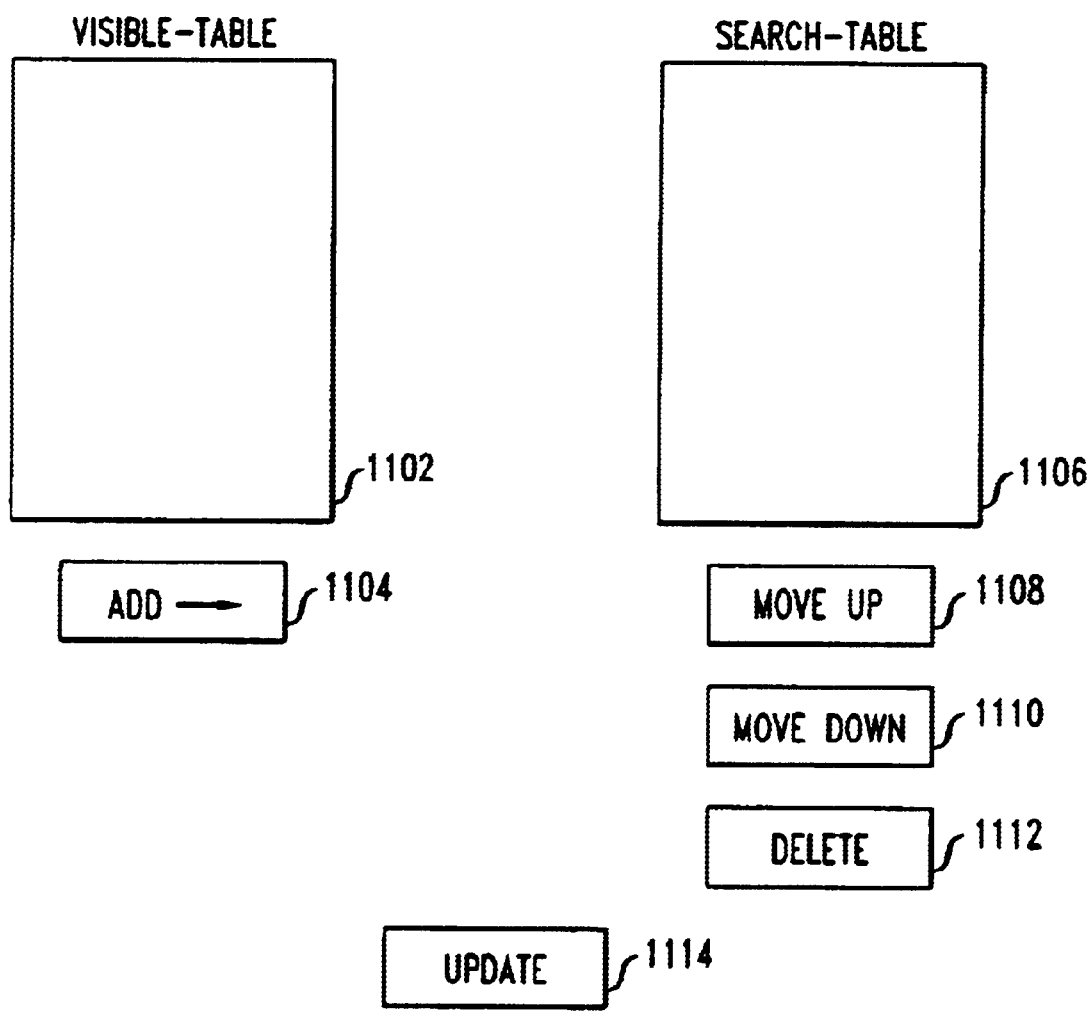
FIG. 11 shows a user interface used in conjunction with the update-search-table function.

A user may also update his/her search-table in order to modify the address-table search order during an address resolution, as will be described in further detail below. The update-search-table function will be described in conjunction with FIG. 10, which illustrates the steps performed by, and the interaction between, a browser and server during the update-search-table function. In step 1002 the user of the browser initiates the update-search-table function by, for example, clicking on an update-search-table icon on the computer screen, or by some other method. In response to initiation of the update-search-table function, in step 1004 the browser generates the following URL, server.com/update-search-table. An http request containing this URL is transmitted to the server in a well known manner. Upon receipt of the request, in step 1006 the server executes the update-search-table program, which is stored as computer program code 206 in memory 204 of server 145 (FIG. 2). The execution of the update-search-table program results in the generation of an html page being sent to the browser. This html page will implement a user interface which will allow the user to convey the required search-table updates to the server. One example of such a user interface is shown in FIG. 11. In accordance with the interface, the visible-table is displayed alongside the search-table. In order to add an address-table to the user's search order, the userid of the user who maintains that address-table is highlighted on the left side 1102 of the display and the user clicks the add icon 1104. This results in adding the highlighted userid to the right side 1106 of the display. Userids which are already in the search-table may be moved up in the search-table, moved down in the search-table, or deleted from the search-table, by highlighting the user identification and clicking on icons 1108, 1110, or 1112 respectively. When the right side of the display 1106 shows the desired search order, the user clicks the update icon 1114. This results in the browser transmitting to the server the list of userids shown on the right side of the display 1106 in step 1010. The server then uses the received information to update the search-table in an appropriate manner in step 1012.

Figure 12:
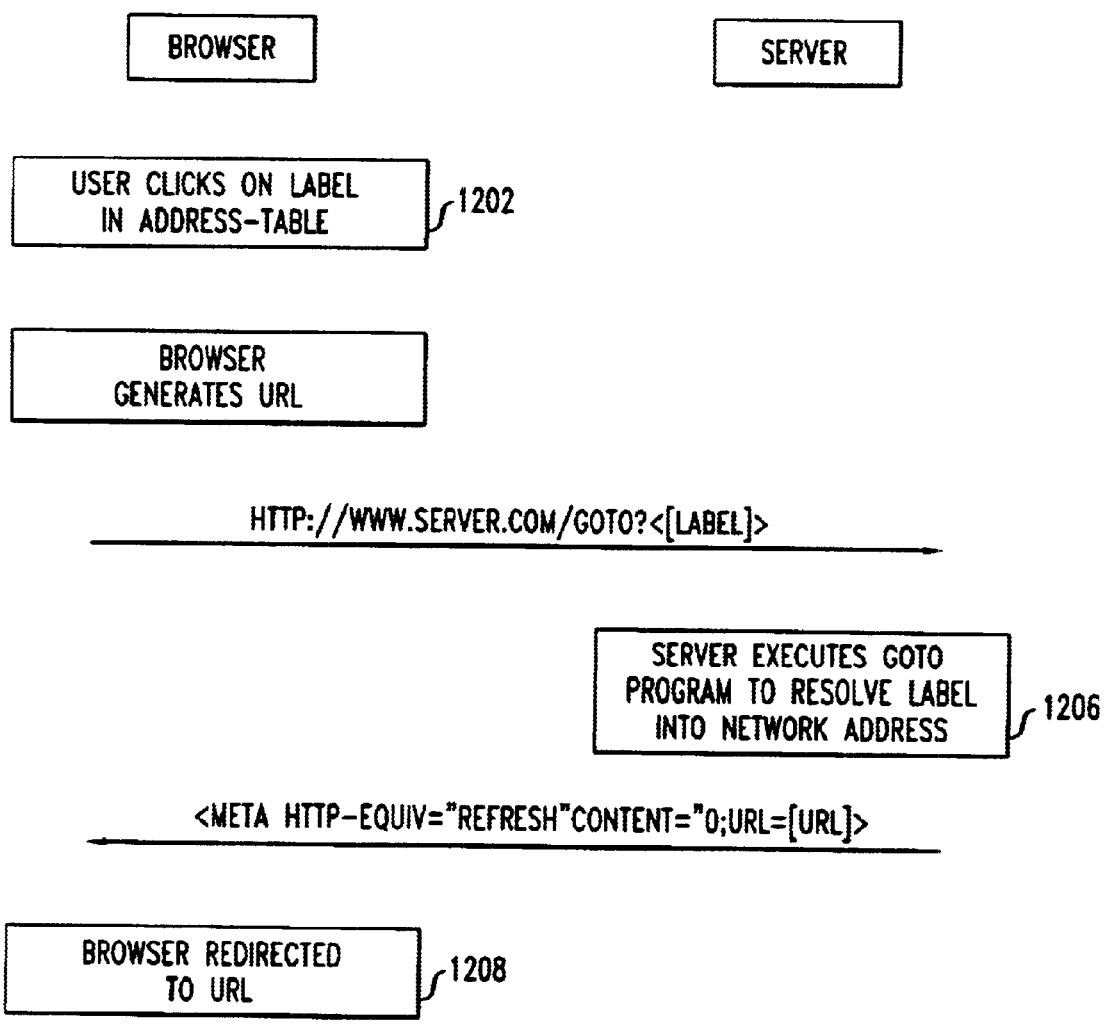
FIG. 12 illustrates the steps performed by, and the interaction between, the browser and server during the goto function.

The user may navigate to particular web sites directly from the display of database tables which are displayed as a result of the list function. For example, a user may click on a label displayed in the address-table and be directed to the associated web site as follows. Referring to FIG. 12, in step 1202 a user clicks on a label displayed in connection with the user's address-table. In response, in step 1204 the browser generates the following URL, server.com/goto?<[label]>, where [label] represents the label on which the user clicked. An http request containing this URL is transmitted to the server in a well known manner. Upon receipt of the request, in step 1206 the server executes the goto program, which is stored as computer program code 206 in memory 204 of server 145 (FIG. 2). The execution of the goto program results in the server accessing the user's address-table to retrieve the URL associated with the received label. The server then generates the following redirect command, <meta http-equiv="refresh" content="0;url=[url]>, which is sent to the browser. Upon receipt of this redirect command, in step 1208 the browser will be redirected to the [url] indicated in the redirect command, which is the network address resolved by the server in step 1206.

Figure 13:
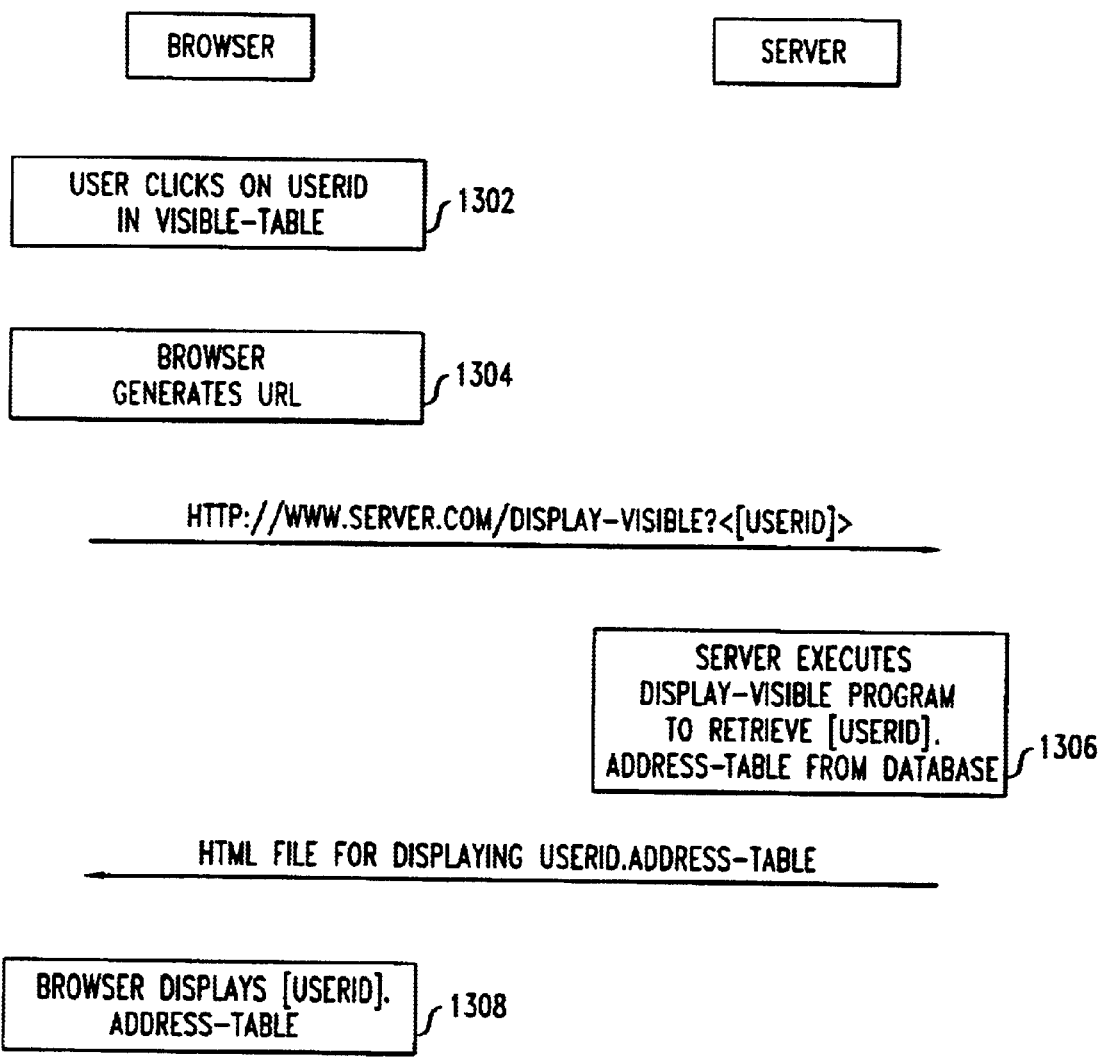
FIG. 13 illustrates the steps performed by, and the interaction between, the browser and server during the display-visible function.

The user may navigate to a particular website using the address-table associated with another user. As described above, as a result of the list function, a user's visible-table is displayed. With reference to FIG. 13, the user may click on a user identification in the visible table in step 1302 and in response the browser' generates the following URL, .server.com/display-visible?<[userid]>, where [userid] represents the userid in the visible-table on which the user clicked. An http request containing the URL generated by the browser in step 1304 is transmitted to the server in a well known manner. Upon receipt of the request, in step 1306 the server executes the display-visible program, which is stored as computer program code 206 in memory 204 of server 145 (FIG. 2). The execution of the display-visible program results in the server retrieving the identified user's address-table, i.e., [userid].address-table, from the database 214 and generating an html page which is sent to the browser. The page is formatted to display the [userid].address-table on the browser. Thus, upon receipt of the html page, in step 1308 the browser will display the address-table of the identified user. The user of the browser may then click on a label in the displayed address-table and functions similar to those described above in connection with FIG. 12 will be performed in order to redirect the browser to the web site associated with the chosen label.

Figure 14:
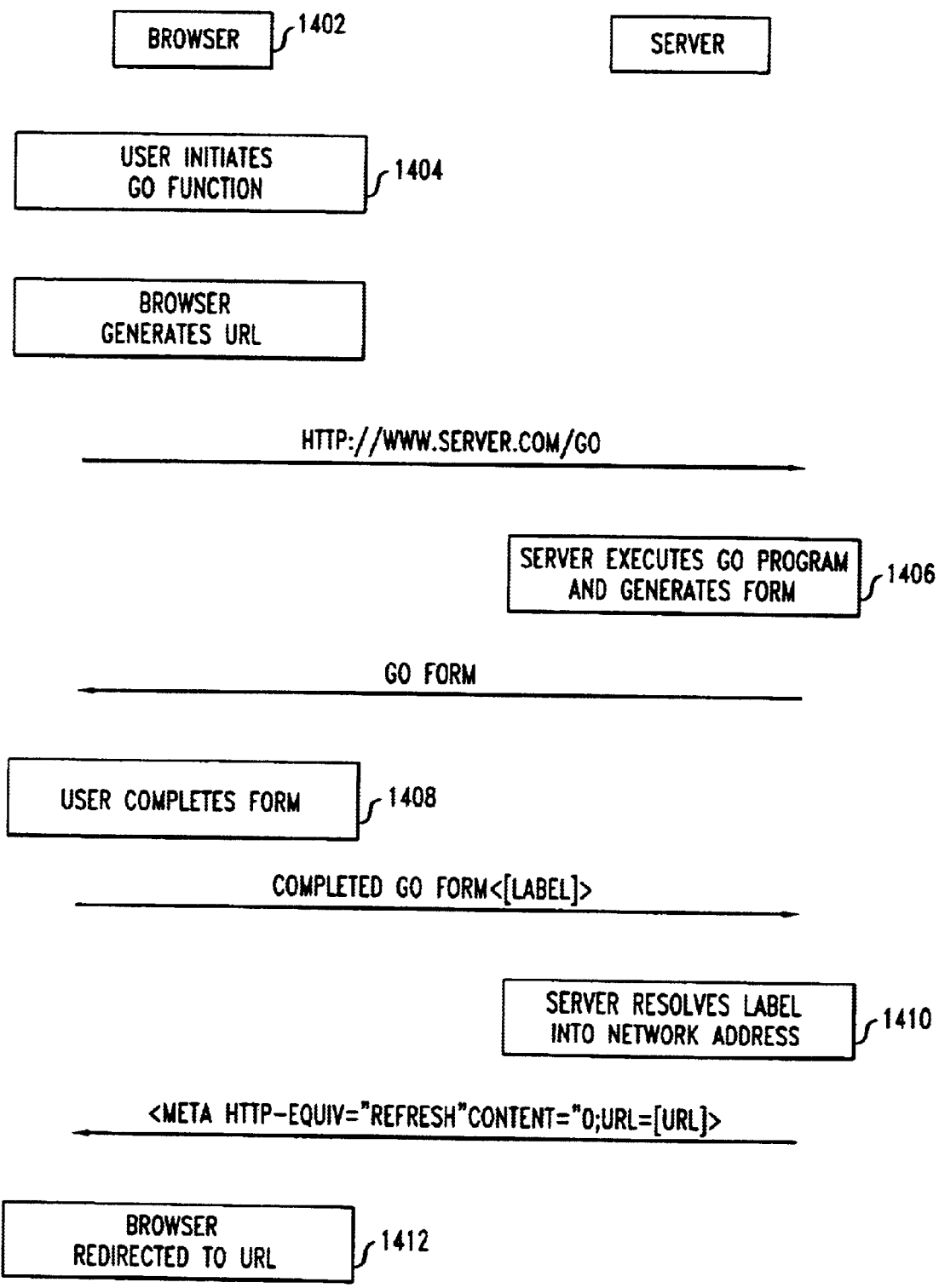
FIG. 14 illustrates the steps performed by, and the interaction between, the browser and server during the go function.

One advantage of the present invention is the ability to perform hierarchical searching of address-tables in a predetermined order. This function is initiated by a user initiating a go function as described in conjunction with FIG. 14. In step 1402 the user of the browser initiates the go function by, for example, clicking on a go icon on the computer screen, or by some other method. In response to initiation of the go function, in step 1404 the browser generates the following URL, .server.com/go. An http request containing the URL is transmitted to the server in a well known manner. Upon receipt of the request, in step 1406 the server executes the go program, which is stored as computer program code 206 in memory 204 of server 145 (FIG. 2). The execution of the go program results in the generation of an http form which is sent to the browser. The form will request that the user enter a label which is to be resolved into a network address. In step 1408 the user completes the form and returns the requested form information to the server. Upon receipt of the form information, the server resolves the label into a network address in step 1410 as follows. First, the server accesses the user's search-table in database 214 in order to determine the search order of address-tables. It is noted that the search order may be indicated by the search-table in a number of ways. For example, the search table may contain an explicit search order field associated with each userid to indicate the order in which the address-tables are to be searched. In the embodiment described herein, the search order is simply the order in which the userids appear in the search-table, with the first address-table to be searched being at the top of the list, and the last address-table to be searched being at the bottom of the list. After accessing the search-table, the server then accesses the address-table of the first userid stored in the search-table and determines if the label to be resolved is present in that address-table. If it is, then the server resolves the received label into the network address associated with the label in the address-table. If the label is not present in the address-table, then the server accesses the address-table of the next userid stored in the search-table to determine if the label is present in that address-table. This procedure continues until the server finds the label in an address-table and resolves the label into a network address, or until there are no further user-ids in the search-table and therefore no further address-tables to search, in which case the server determines that the label cannot be resolved into a network address. Thus, the server will search the address-tables associated with the userids stored in the user's search-table, and will search the address-tables in the order specified in the search-table. Upon resolving the label into a network address in step 1410, the server then generates the following redirect command, <meta http-equiv="refresh" content="0;url=[url]>, which is sent to the browser. Upon receipt of this redirect command, in step 1412 the browser will be redirected to the [url] indicated in the redirect command, which is the network address resolved by the server in step 1410.

In accordance with one embodiment of the invention, the search order stored in a user's search-table may be overridden for particular label resolutions if so indicated by the user. For example, consider the following Table 1 which describes the possible user commands which a user may enter into the form in step 1408.

TABLE 1

| | |
|---|---|
| [label] | This is the standard search described above and results in searching all address-tables associated with userids stored in the search-table in the order specified in the search-table. |
| [userid]/ [label] | The search begins at the address-table of the identified userid and then continues from that point searching in the order specified in the search-table. The address-tables associated with userids which are prior to the entered userid in the specified search order are not searched if the end of the search-table is reached with the label not yet found. This search technique may alternatively wrap-around to search the address-tables associated with the userids which are prior to the entered userid in the specified search order if the end of the search-table is reached with the label not yet found. |
| DIRECT/ [userid]/ [label] | Only the address-table associated with the identified userid is searched. It is noted that this userid does not have to be in the search-table of the user performing the search, but must be in the visible-table of the user performing the search. |
| MYTABLE/ [label] | Only the address-table associated with the user requesting the address resolution is searched. |
| START/ [userid]/ [label] | The search will begin with the address-table associated with the identified userid. Again, it is noted that this userid does not have to be in the search-table of the user performing the search, but must be in the visible table of the user performing the search. If not found in the initially searched address-table, then the standard search will be performed in the order specified in the search-table (of course skipping the address-table associated with the identified userid if in the search-table). |

Figure 15:
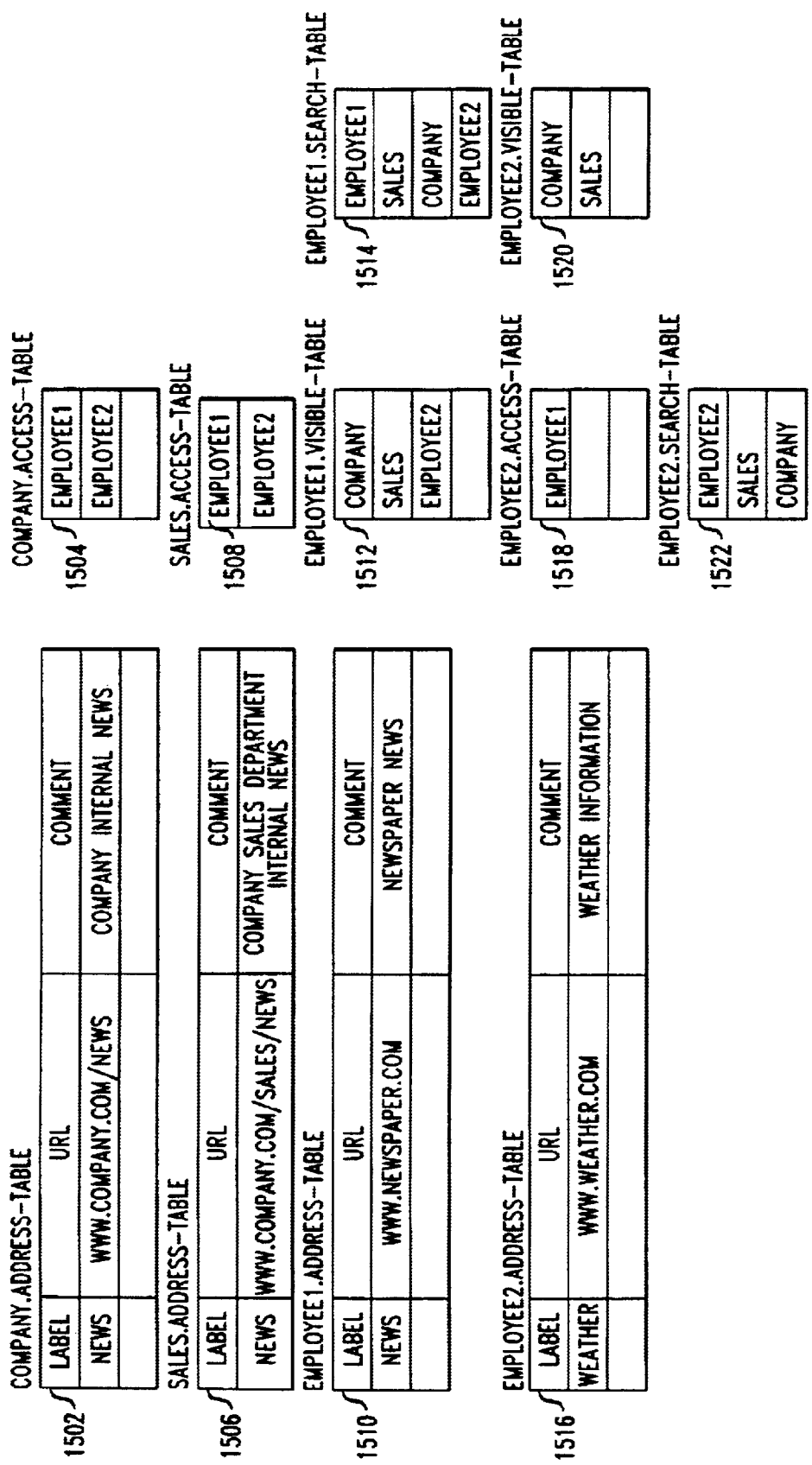
FIG. 15 shows example database tables.

An example of the operation of the browser and server, in accordance with an embodiment of the invention, will now be given. FIG. 15 shows certain of the database tables stored for four userids: company, sales, employee1 and employee2. The userid company is associated with a particular company, and FIG. 15 shows the associated company.address-table 1502 and the company.access-table 1504. The company.address-table 1502 contains the label "news" with the associated URL which points to the company's internal news site. The company.access-table 1504 grants employee1 and employee2 authorization to access the company.address-table 1502.

The userid sales is associated with the sales division of the company and FIG. 15 shows the associated sales.address-table 1506 and the sales.access-table 1508. The sales.address-table 1506 also contains the label "news" with the associated URL which points to the sales department internal news site. The sales.access-table 1508 grants employee1 and employee2 authorization to access the sales.address-table 1506.

The userid employee1 is associated with an employee of the company and FIG. 15 shows the associated employee1.address-table 1510, employee1.visible-table 1512, and the employee1.search-table 1514. The employee1.address-table 1510 also contains the label "news" with the associated URL which points to an external newspaper news site. The employee1.visible-table 1512 indicates that employee1 has authority to access the company.address-table 1502, the sales.address-table 1506, and the employee2.address-table 1516, which is a result of the userid employee1 being present in the company.access-table 1504, the sales.access-table 1508, and the employee2.access-table 1518 (described below) respectively. The employee1.search-table 1514 indicates the address-tables to search, and the order of that search, when employee1 requests a label resolution.

The userid employee2 is also associated with an employee of the company and FIG. 15 shows the associated employee2.address-table 1516, employee2.visible-table 1520, the employee2.access-table 1518, and the employee2.search-table 1522. The employee2.address-table 1516 contains the label "weather" with the associated URL which points to an external weather site. The employee2.visible-table 1520 indicates that employee2 has authority to access the company.address-table 1502 and the sales.address-table 1506, which is a result of the userid employee2 being present in the company.access-table 1504 and the sales.access-table 1508 respectively. The employee2.search-table 1522 indicates the address-tables to search, and the order of that search, when employee2 requests an address resolution. The employee2.access-table 1518 indicates that employee1 has authority to access the employee2.address-table 1516.

As a first example, assume employee1 initiates the go function and provides the server with the label "news". Upon receipt of the label, and in accordance with the functionality described above, the server will resolve the label into a network address as follows. First, the server will access the employee1.search-table 1514 and determine that the following address-tables should be searched in the given order:

employee1.address-table
sales.address -table
company.address -table
employee2.address -table The first table to be searched is the employee1.address -table 1510. The server will find the label "news" in the employee1.address -table 1510, the label will be resolved into the network address www.newspaper.com, and employee1's browser will be redirected to the www.newspaper.com web site.

If employee1 wanted to resolve the label "news" into a network address other than as stored in employee1.address-table 150, then employee1 could use one of the overriding techniques described above in Table 1. For example, if employee1 were specifically interested in news from the sales department, employee1 could enter the label: DIRECT/sales/news, which indicates that the search should directly search the sales.address-table only. In accordance with one advantage of the invention, the actual address associated with the label "news" in the sales.address-table 1506 may be updated periodically by the maintainer of the sales.address-table 1506, and users who access the sales.address-table 1506 will be automatically redirected to the updated site.

As another example, assume that employee1 entered the label weather. The first three userids (employee1, sales, company) in the employee1.search-table 1514 do not have the label "weather" in their associated address-tables. However, the last userid, employee2, has the label "weather" in the employee2.address-table 1516, and as such, the label "weather", entered by employee1, will be resolved into the network address www.weather.com. As such, employee1 is able to benefit from labels and associated network addresses stored by other users. In accordance with an advantage of the invention, if at a later time, employee1 finds a weather site (e.g. localweather.com) that he/she prefers over the weather site (weather.com) of employee2, employee1 can store the preferred site with a label in his/her own address-table 1510 and thereafter, if employee1 enters the label "weather", it will be resolved into the network address of employee1's preferred weather site because employee1 has indicated in employee1.search-table 1514 that the employee1.address-table 1510 is searched prior to searching employee2.address-table 1516.

As another example, it can be seen from FIG. 15 that if emloyee2 were to initiate the go function with the label "news", the server would resolve the label into the network address www.company.com/sales/news as identified by sales.address-table 1506 because that is the first table identified in the employee2.search-table 1522 which contains the label news.

As can be seen by the above description, the present invention provides a flexible technique for resolving labels into network addresses. Users may use labels maintained by other entities for label resolution, thereby allowing all users to benefit from periodic updating by a single entity. Further, the hierarchical searching aspects, along with the ability to override a predetermined search order, also provide powerful address resolution techniques.

It is noted that although the particular embodiments described above are directed to WWW network addresses (e.g. URLs), the inventive technique may be applied to any type of network address resolution. For example, the labels in the address-table may be associated with electronic mail (email) addresses rather than WWW addresses. In such an embodiment, instead of the server generating a redirect command which results in redirecting a browser to a network address associated with a label in steps 1412 (FIG. 14) and 1208 (FIG. 12), the server would return a redirect command which would cause the browser to open a mail window addressed to the resolved email network address in steps 1412 and 1208. Of course, particular embodiments could support both WWW and email network address resolution. Further, other types of network addresses, such as FTP and Telnet, as well as others, could also be supported by various embodiments of the invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for resolving labels into network addresses comprising the steps of:

receiving a label;

accessing a plurality of address tables in an order defined by a user modifiable search table, each of said address tables storing labels and associated network addresses, and retrieving a network address associated with said received label from the first accessed address table containing said received label.

2. The method of claim 1 wherein said order in said search table is modified by a user command.

3. The method of claim 1 wherein said label is received from a user and wherein at least one of said plurality of address tables is maintained by an entity other than said user.

4. The method of claim 3 wherein said at least one of said plurality of address tables maintained by an entity other than said user is accessible by said user as a result of the identification of said user in an access table of said entity.

5. The method of claim 3 wherein said at least one of said plurality of address tables maintained by an entity other than said user is accessible by said user as a result of said entity granting access to said user.

6. The method of claim 1 wherein said network address is a WWW address.

7. The method of claim 1 wherein said network address is an electronic mail address.

8. A database for use in resolving labels into network addresses, said database storing, for each of a plurality of users:

an address table comprising labels and associated network addresses; and a user modifiable search table defining an address table search order of a plurality of address tables for use in resolving a label into a network address.

9. The database of claim 8 further storing, for each of a plurality of users:

a visible table defining address tables which a particular user has authority to access.

10. The database of claim 8 wherein the visible table of a particular user is maintained by said computer as a function of an access table of other users.

11. The database of claim 10 wherein the visible table of a particular user contains identifications of other users whose access tables contain an identification of said particular user.

12. The database of claim 8 further storing, for each of a plurality of users:

an access table associated with a particular user defining other users who have access to said particular user's address table.

13. The database of claim 8 wherein said network addresses are WWW addresses.

14. The database of claim 8 wherein said network addresses are electronic mail addresses.

15. A computer for resolving labels into network addresses, said computer comprising:

a memory storing computer program instructions;

a processor for executing said computer program instructions and for controlling the operation of said computer in accordance with the functions defined by said computer program instructions, said computer program instructions defining the steps of:

receiving a label;

accessing a plurality of address tables in an order defined by a user modifiable search table, each of said address tables storing labels and associated network addresses, and retrieving a network address associated with said received label from the first accessed address table containing said received label.

16. The computer of claim 15 wherein said order in said search table is modified by a user command.

17. The computer of claim 15 wherein said label is received from a user and wherein at least one of said plurality of address tables is maintained by an entity other than said user.

18. The computer of claim 15 wherein said at least one of said plurality of address tables maintained by an entity other than said user is accessible by said user as a result of the identification of said user in an access table of said entity.

19. The computer of claim 15 wherein said at least one of said plurality of address tables maintained by an entity other than said user is accessible by said user as a result of said entity granting access to said user.

20. The computer of claim 15 wherein said network address is a WWW address.

21. The computer of claim 15 wherein said network address is an electronic mail address.

22. A method for operation of a network server for resolving a label received from a remote user into a network address, said method comprising the steps of:

receiving a label from said remote user;

accessing a user modifiable search table associated with said user, said search table defining a plurality of address tables to be searched and a search order;

accessing said plurality of address tables in said search order;

retrieving a network address from the earliest accessed address table which contains said label; and sending said retrieved network address to said user.

23. The method of claim 22 wherein said network address is a WWW address and wherein said step of sending comprises the step of:

sending a redirect command which will result in a browser used by said user being redirected to said WWW address.

24. The method of claim 22 wherein said network address is an electronic mail address and wherein said step of sending comprises the step of:

sending a redirect command which will result in a browser used by said user opening a mail application with a message addressed to said electronic mail address.

25. The method of claim 22 wherein at least one of said plurality of address tables is maintained by an entity other than said user.

26. The method of claim 22 wherein said search order is modified by a user command.

* * * * *

UNITED STATES PATENT AND TRADEMARK OFFICE
CERTIFICATE OF CORRECTION

| | | |
|---|---|---|
| PATENT NO. | : 6,643,658 B1 | Page 1 of 1 |
| APPLICATION NO. | : 09/487516 | |
| DATED | : November 4, 2003 | |
| INVENTOR(S) | : Ben Jai, Clifford E. Martin and Abraham Silbershatz | |

It is certified that error appears in the above-identified patent and that said Letters Patent is hereby corrected as shown below:

Column 13 - Claim 10

Delete: The database of claim 8 wherein the visible table of a particular user is maintained by said computer as a function of an access table of other users.

Insert: The database of claim 8 wherein the visible table of a particular user is maintained by a computer as a function of an access table of other users.

Signed and Sealed this

First Day of May, 2007

JON W. DUDAS
*Director of the United States Patent and Trademark Office*